United States Patent [19]

Khouri et al.

[11] Patent Number: 5,281,667

[45] Date of Patent: Jan. 25, 1994

[54] EPOXY-FUNCTIONALIZED POLYPHENYLENE ETHERS OF LOW GEL CONTENT, METHOD FOR THEIR PREPARATION, AND COPOLYMER-CONTAINING COMPOSITIONS PREPARED THEREFROM

[75] Inventors: Farid F. Khouri, Clifton Park, N.Y.; Robert J. Halley, Atlanta, Ga.; John B. Yates, III, Glenmont, N.Y.

[73] Assignee: General Electric Company, Schenectady, N.Y.

[21] Appl. No.: 13,879

[22] Filed: Feb. 5, 1993

Related U.S. Application Data

[62] Division of Ser. No. 841,178, Feb. 25, 1992, Pat. No. 5,214,099.

[51] Int. Cl.$^5$ .................. C08F 283/08; C08L 25/02; C08L 71/12; C08L 67/02
[52] U.S. Cl. ..................... 525/149; 524/490; 525/391; 525/396; 525/397; 525/905
[58] Field of Search ............ 524/490; 525/149, 391, 525/396, 397, 905

[56] References Cited

U.S. PATENT DOCUMENTS

| | | | |
|---|---|---|---|
| 4,870,123 | 9/1989 | Nelson | 524/490 |
| 4,870,124 | 9/1989 | Nelson | 524/490 |
| 4,994,525 | 2/1991 | Brown et al. | 525/396 |
| 4,994,531 | 2/1991 | Brown et al. | 525/391 |
| 5,015,698 | 3/1991 | Sybert et al. | 525/391 |

FOREIGN PATENT DOCUMENTS 2077742  12/1981  United Kingdom .

*Primary Examiner*—James J. Seidleck
*Assistant Examiner*—Thomas Hamilton, III
*Attorney, Agent, or Firm*—William H. Pittman

[57] ABSTRACT

Epoxy-functionalized polyphenylene ethers are prepared by melt blending a polyphenylene ether with glycidyl acrylate in the presence of a lubricant such as at least one hydrogenated poly-α-olefin. The blending reaction takes place at a temperature in the range of about 250°–300° C., and the amount of glycidyl acrylate employed is about 2.5–5.0% by weight based on polyphenylene ether. The products are characterized by a gel content of less than 5% by weight. They form copolymer-containing compositions having excellent properties upon melt blending with linear polyesters such as poly(butylene terephthalate).

11 Claims, No Drawings

EPOXY-FUNCTIONALIZED POLYPHENYLENE ETHERS OF LOW GEL CONTENT, METHOD FOR THEIR PREPARATION, AND COPOLYMER-CONTAINING COMPOSITIONS PREPARED THEREFROM

This application is a division of application Ser. No. 07/841,178, filed Feb. 25, 1992, now U.S. Pat. No. 5,214,099.

This invention relates to the functionalization of polyphenylene ethers, and more particularly to an improved method for epoxy functionalization thereof.

Polyphenylene ethers are a widely used class of thermoplastic engineering resins characterized by excellent hydrolytic stability, dimensional stability, toughness, heat resistance and dielectric properties. However, they are deficient in certain other properties such as workability and solvent resistance. Therefore, there is a continuing search for means for modifying polyphenylene ethers to improve these other properties.

Among the means being studied are blending of polyphenylene ethers with certain other resinous materials such as polyesters, polyamides or olefin polymers. Blends of these other materials with polyphenylene ethers are, however, usually incompatible. Molded parts fabricated from such blends are generally brittle and may undergo catastrophic delamination upon impact.

Compatibilization of blends of polyphenylene ethers with these other polymers may be achieved by several methods. A frequently preferred method is the formation of a copolymer of the polyphenylene ether with the other polymer; when present in the blend, said copolymer serves as a compatibilizer for the uncopolymerized constituents.

Copolymerization of polyphenylene ethers with other polymers is facilitated by the presence of reactive groups on the polyphenylene ether. U.S. Pat. Nos. 4,994,531 and 5,015,698 disclose various methods for providing such reactive groups, one of which is a reaction between the polyphenylene ether and an unsaturated epoxy compound such as glycidyl acrylate or glycidyl methacrylate. Such reactions are disclosed as being conducted in solution or in the melt at temperatures in the range of about 100°–350° C., sometimes in the presence of a free radical initiator. Compositions comprising the epoxy-functionalized polyphenylene ether and linear polyesters, such as poly(butylene terephthalate), have relatively high notched Izod impact strengths as illustrated by an impact strength of 134 joules/m. for a composition comprising 36% (by weight) epoxy-functionalized polyphenylene ether, 54% poly(butylene terephthalate) and 10% of a commercially available impact modifier.

An impact strength of this order of magnitude is definitely an improvement over that of a simple polyphenylene ether-polyester blend. However, it would be desirable to provide a method for improving the impact strength even more.

In addition, it is frequently found that the compatibilized compositions have wide variability in impact strength. This typically displays itself as a very high standard deviation from the average impact strength determined in several duplicate testing procedures. Standard deviations from 25% to greater than 60%, expressed as a proportion of average impact strength, are sometimes encountered. Such values are much too high to be commercially acceptable; a standard deviation of less than 5% is preferred.

The present invention provides epoxy-functionalized polyphenylene ethers which, when blended with other polymers such as linear polyesters, afford copolymer-containing compositions having uniformly high impact strengths. Moreover, they are easily prepared in the melt at relatively low temperatures.

The invention is based on the discovery that various aspects of the functionalization method disclosed in the above-identified patents may result in formation of a product having a high proportion of insoluble gel, probably caused by crosslinking of the epoxy-functionalized polyphenylene ether. Gel proportion is typically determined by extracting the polyphenylene ether for 48 hours with a solvent therefor such as toluene or chloroform, weighing the undissolved residue and expressing the amount thereof as a weight percentage of the polyphenylene ether in the sample. Gel proportions greater than 25% (by weight) are typical of compositions produced by the prior art method. The present invention, on the other hand, typically affords functionalized polymers with a gel content no greater than 5%.

In one of its aspects, the invention includes a method for preparing epoxy-functionalized polyphenylene ethers which comprises melt blending, at a temperature in the range of about 250°–300° C., at least one polyphenylene ether with about 2–4% by weight, based on said polyphenylene ether, of glycidyl acrylate in the presence of an effective amount of at least one lubricant which is substantially inert to glycidyl acrylate and polyesters; the blending time being effective to produce a polymer having a gel content no greater than 5% by weight. Another aspect is functionalized polyphenylene ethers thus prepared.

The polyphenylene ethers employed in the present invention are known polymers comprising a plurality of structural units of the formula

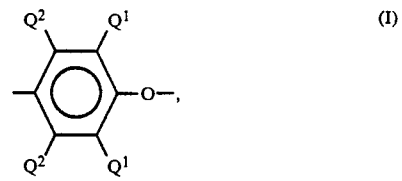

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Most often, each $Q^1$ is alkyl or phenyl, especially $C_{1-4}$ alkyl, and each $Q^2$ is hydrogen.

Both homopolymer and copolymer polyphenylene ethers are included. The preferred homopolymers are those containing 2,6-dimethyl-1,4-phenylene ether units. Suitable copolymers include random copolymers containing such units in combination with (for example) 2,3,6-trimethyl-1,4-phenylene ether units. Also included are polyphenylene ethers containing moieties prepared by grafting onto the polyphenylene ether in known manner such materials as vinyl monomers or polymers such as polystyrenes and elastomers, as well as coupled polyphenylene ethers in which coupling agents such as low molecular weight polycarbonates, quinones, heterocycles and formals undergo reaction in known manner with the hydroxy groups of two polyphenylene ether chains to produce a higher molecular weight polymer, provided a substantial proportion of free OH groups remains.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.15–0.6 dl./g., as measured in chloroform at 25° C.

The polyphenylene ethers are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful polyphenylene ethers for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the polyphenylene ethers contemplated for use in the present invention include all those presently known, irrespective of variations in structural units or ancillary chemical features.

The epoxy compound employed according to the present invention is glycidyl acrylate. It has been found superior to the other epoxy compounds listed in the aforementioned U.S. Pat. No. 4,994,530, in that it reacts with polyphenylene ethers to form materials which, when blended with polyesters, produce compositions of particularly high impact strengths.

Also employed according to the invention is at least one lubricant which is substantially inert to glycidyl acrylate and polyesters. The presence of the lubricant decreases the required melt processing temperature to produce the functionalized polymers, as well as compatibilized blends prepared therefrom. As a result, gel formation is minimized.

Suitable lubricants will be apparent to those skilled in the art; in general, they are solids with high lubricity or relatively low melting solids or oils. Examples are polytetrafluoroethylene, fatty acid amides as disclosed and claimed in copending, commonly owned application Ser. No. 07-815,211, now abandoned, aluminum alkylphosphonates as disclosed and claimed in copending, commonly owned application Ser. No. 07-816,629, and hydrogenated poly-α-olefins as disclosed and claimed in copending, commonly owned application Ser. No. 07-816,430.

The hydrogenated poly-α-olefins are often preferred. They may be obtained by the catalytic polymerization of α-olefins followed by hydrogenation to remove residual unsaturation. The catalysts which may be employed in their preparation include cationic and metathetic catalysts. Methods for preparing hydrogenated poly-α-olefins are disclosed, for example, in U.S. Pat. Nos. 4,225,739, 4,282,392, 4,311,864, 4,319,065, 4,334,113 and 4,409,415. The products comprise polymers of various molecular weights, including oligomers.

The most preferred hydrogenated poly-α-olefins are those having kinematic viscosities of about 2–20 centistokes and especially 8–12 centistokes at 100° C., as determined by ASTM procedure D445. They are commercially available from such companies as Henkel Corporation and Gulf Oil Corporation.

According to the invention, the polyphenylene ether is melt blended with about 2–4% by weight of said glycidyl acrylate. The preferred amount of glycidyl acrylate is 3–4%; lower proportions than 2% may not achieve the desired level of functionalization and higher proportions often cause an increase in gel content.

Also present during melt blending is a lubricating amount of the hydrogenated poly-α-olefin. Said lubricating amount is generally in the range of about 1–5% and preferably about 2–4% by weight, also based on polyphenylene ether.

It is highly preferred to employ a melt blending method which results in the formation of an intimate blend. Conventional melt blending procedures and equipment may be employed, with extrusion often preferred because of its relative convenience and particular suitability.

Those skilled in the art will be familiar with blending methods and apparatus capable of intimately blending resinous constituents, especially by kneading. They are exemplified by disc-pack processors and various types of extrusion equipment. Illustrations of the latter are continuous mixers; single screw kneading extruders; corotating, intermeshing and counterrotating, nonintermeshing twin screw extruders having such features as staggered configuration screws, forward-flighted compounders, cylindrical bushings and left-handed screw elements; and extruders having screws which include at least one and preferably two or more kneading block elements.

The temperature and time of melt blending are critical for the purposes of this invention. Temperatures should be in the range of about 250°–300° C., with about 260°–285° C. being preferred and 260°–275° C. most preferred. At lower temperatures, extrusion of the polyphenylene ether is difficult or impossible.

Higher temperatures produce polymers having high gel content. Above about 285° C., the heating period must be kept very short to avoid gel contents higher than 5%. That is the reason for the preferred and most preferred maximum temperatures of 285° C. and 275° C., respectively. Those skilled in the art will be able to determine, by simple experimentation, what heating times are suitable at any given temperature to produce capped polymers having the necessary low gel content.

It is usually advantageous to employ a free radical initiator in the reaction. Typical initiators are known in the art and include such compounds as benzoyl peroxide, dicumyl peroxide, di-t-butyl peroxide, t-butyl hydroperoxide, 2,5-dimethyl-2,5-di-t-butylperoxy-3-hexyne and azobisisobutyronitrile. The proportion of initiator is typically in the range of about 0.1–5% by weight, based on polyphenylene ether.

It is generally acceptable, and often preferred, to employ the melt blended composition (obtained, for example, as extruded pellets) directly for copolymer formation as described hereinafter. In some instances, however, it may be desired to prepare a polymer powder by dissolving the melt blended material in a suitable solvent and reprecipitating by addition of a non-solvent such as acetone. Such an operation may also remove the poly-α-olefin employed as lubricant. Since the presence of lubricant is highly beneficial during copolymer formation, it is then highly desirable to introduce additional lubricant in that step.

The precise chemical nature of the functionalization which takes place according to this invention is not known with certainty. The principal reaction may be a thermally initiated interaction (often of the free radical type) of the carbon-carbon double bond in the glycidyl acrylate with the aromatic rings or the substituents thereon, especially the latter, to produce a polymer which may include single moieties and/or grafted side chains derived from the glycidyl acrylate.

The epoxy-functionalized polyphenylene ethers of this invention react with other polymers containing reactive groups, particularly those capable of nucleophilic aliphatic addition or substitution such as amine, hydroxy, thio and carboxy groups and functional derivatives of said carboxy groups, including ester and anhydride moieties, to form copolymer-containing compositions. Said reactive groups may be present at any location in the other polymer molecule; i.e., they may be end groups, substituents and grafted moieties. Thus, it is possible to form copolymer-containing compositions from numerous polymers which are otherwise incompatible with polyphenylene ethers, including polyesters and polyamides. By reason of the presence of the copolymer, such compositions are compatible and may be molded into articles having excellent physical properties. They are also useful for further compatibilizing blends of the two polymers to form molding compositions having similar excellent properties.

Copolymer-containing compositions prepared by reaction of the functionalized polyphenylene ethers with at least one linear polyester are another aspect of the invention. They are particularly notable by reason of their high impact strengths. Polyesters suitable for their preparation include those comprising structural units of the formula

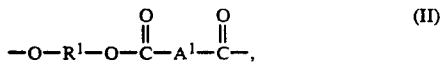

wherein each $R^1$ is independently a divalent aliphatic, alicyclic or aromatic hydrocarbon or polyoxyalkylene radical and $A^1$ is a divalent aromatic radical. Such polyesters include thermoplastic polyesters illustrated by poly(alkylene dicarboxylates), elastomeric polyesters, polyarylates, and polyester copolymers such as copolyestercarbonates. Because the principal reaction which occurs with the substituent groups in the functionalized polyphenylene ether involves a carboxylic acid group of the polyester, it is highly preferred that said polyester have a relatively high carboxylic end group concentration. Concentrations in the range of about 5–250 microequivalents per gram are generally suitable, with 10–100 microequivalents per gram being preferable, 30–100 being more preferable and 40–80 being particularly desirable.

The polyester may include structural units of the formula

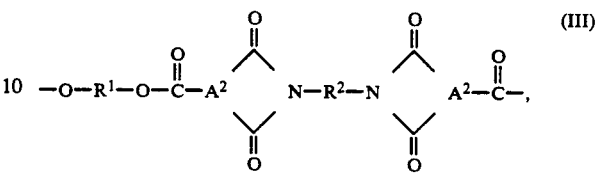

wherein $R^1$ is as previously defined, $R^2$ is a polyoxyalkylene radical and $A^2$ is a trivalent aromatic radical. The $A^1$ radical in formula II is most often p- or m-phenylene or a mixture thereof, and $A^2$ in formula III is usually derived from trimellitic acid and has the structure

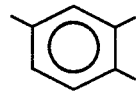

The $R^1$ radical may be, for example, a $C_{2-10}$ alkylene radical, a $C_{6-10}$ alicyclic radical, a $C_{6-20}$ aromatic radical or a polyoxyalkylene radical in which the alkylene groups contain about 2–6 and most often 4 carbon atoms. As previously noted, this class of polyesters includes the poly(alkylene terephthalates) and the polyarylates. Poly(alkylene terephthalates) are frequently preferred, with poly(ethylene terephthalate) and poly(butylene terephthalate) being most preferred.

The polyester generally has a number average molecular weight in the range of about 20,000–70,000, as determined by gel permeation chromatography or intrinsic viscosity (IV) at 30° C. in a mixture of 60% (by weight) phenol and 40% 1,1,2,2-tetrachloroethane.

Polyamides suitable for copolymer formation may be made by any known method. They preferably contain a substantial proportion of amine end groups. In many instances, polyamides in which the amine end group concentration is at least about 60 meq./g. are particularly useful. It is also within the scope of the invention, however, to employ predominantly carboxylic acid-terminated polyamides.

Suitable polyamides include those of the type prepared by the polymerization of a monoaminomonocarboxylic acid or a lactam thereof having at least 2 carbon atoms between the amino and carboxylic acid group, of substantially equimolar proportions of a diamine which contains at least 2 carbon atoms between the amino groups and a dicarboxylic acid, or of a monoaminocarboxylic acid or a lactam thereof as defined above together with substantially equimolar proportions of a diamine and a dicarboxylic acid. The dicarboxylic acid may be used in the form of a functional derivative thereof, for example, an ester or acid chloride.

Examples of the aforementioned monoaminomonocarboxylic acids or lactams thereof which are useful in preparing the polyamides include those compounds containing from 2 to 16 carbon atoms between the amino and carboxylic acid groups, said carbon atoms forming a ring with the —CO—NH— group in the case of a lactam. As particular examples of aminocarboxylic acids and lactams there may be mentioned ε-aminocaproic acid, butyrolactam, pivalolactam, ε-caprolactam, capryllactam, enantholactam, undecanolactam, dodecanolactam and 3- and 4-aminobenzoic acids.

Diamines suitable for use in the preparation of the polyamides include the straight chain and branched chain alkyl, aryl and alkaryl diamines. Illustrative diamines are trimethylenediamine, tetramethylenediamine, pentamethylenediamine, octamethylenediamine, hexamethylenediamine (which is often preferred), trimethylhexamethylenediamine, m-phenylenediamine and m-xylylenediamine.

Suitable dicarboxylic acids include those which contain an aliphatic or aromatic group containing at least 2 carbon atoms separating the carboxy groups. The aliphatic acids are often preferred; they include sebacic acid, octadecanedioic acid, suberic acid, glutaric acid, pimelic acid and adipic acid.

Both crystalline and amorphous polyamides may be employed, with the crystalline species often being preferred by reason of their solvent resistance. Typical examples of the polyamides or nylons, as these are often called, include, for example, polyamide-6 (polycaprolactam), 66 (polyhexamethylene adipamide), 11, 12, 63, 64, 6/10 and 6/12 as well as polyamides from terephthalic acid and/or isophthalic acid and trimethylhexamethylenediamine; from adipic acid and m-xylylenediamines; from adipic acid, azelaic acid and 2,2-bis(p-aminophenyl)propane or 2,2-bis(p-aminocyclohexyl)propane and from terephthalic acid and 4,4'-diaminodicyclohexylmethane. Mixtures and/or copolymers of two or more of the foregoing polyamides or prepolymers thereof, respectively, are also within the scope of the present invention. Preferred polyamides are polyamide-6, 66, 11 and 12, most preferably polyamide-66.

The preparation of copolymer-containing compositions may be effected by any method suitable for preparing an intimate blend. While solution blending may be employed in some instances, melt blending operations such as those described hereinabove are usually preferred. If poly-α-olefin has been removed, as by dissolution and reprecipitation of the functionalized polyphenylene ether, an additional portion should be introduced prior to blending with the other polymer.

It is also contemplated to incorporate in the copolymer-containing compositions of this invention impact modifiers compatible with either or both of the polyphenylene ether and the other polymer.

Impact modifiers for polyphenylene ether compositions include natural and synthetic elastomeric polymers, typically derived from such monomers as olefins (e.g., ethylene, propylene, 1-butene and 4-methyl-1-pentene), alkenylaromatic monomers (e.g., styrene and α-methylstyrene), conjugated dienes (e.g., butadiene, isoprene and chloroprene), and vinylic carboxylic acids and their derivatives (e.g., vinyl acetate, acrylic acid, alkylacrylic acids, ethyl acrylate, methyl methacrylate and acrylonitrile). They include homopolymers and random, block, radial block, graft and core-shell copolymers as well as combinations thereof.

Suitable olefin homopolymers include low density, linear low density and high density polyethylene, isotactic polypropylene and the like. Conjugated diene polymers include homopolymers and random copolymers such as polybutadiene, butadiene-styrene copolymers, isoprene-isobutene copolymers, chlorobutadiene polymers, butadiene-acrylonitrile copolymers and polyisoprene. Ethylene-propylene-diene monomer rubbers, comprising predominantly ethylene units, a moderate proportion of propylene units and up to about 20 mole percent of non-conjugated diene monomer units, are also suitable.

A particularly useful class of impact modifiers comprises the AB (diblock) and ABA (triblock) copolymers and core-shell graft copolymers of alkenylaromatic and diene compounds, especially those comprising styrene and butadiene or isoprene blocks. The conjugated diene blocks may be partially or entirely hydrogenated, whereupon they may be represented as ethylene-propylene blocks or the like and have properties similar to those of olefin block copolymers. Examples of triblock copolymers of this type are polystyrene-polybutadiene-polystyrene (SBS), hydrogenated polystyrene-polybutadiene-polystyrene (SEBS), polystyrene-polyisoprene-polystyrene (SIS), poly(α-methylstyrene)-polybutadiene-poly(α-methylstyrene) and poly(α-methylstyrene)-polyisoprene-poly(α-methylstyrene). Particularly preferred triblock copolymers are available commercially as CARIFLEX ®, KRATON D ® and KRATON G ® from Shell.

Also suitable as impact modifiers are the ionomer resins, which may be wholly or partially neutralized with metal ions, and the core-shell type graft copolymers. In general, the latter have a predominantly conjugated diene or crosslinked acrylate rubbery core and one or more shells polymerized thereon and derived from monoalkenylaromatic and/or acrylic monomers alone or in combination with other vinyl monomers. Included are copolymers wherein an interpenetrating network of the resins employed characterizes the interface between the core and shell, such as those available from General Electric Company and described in U.S. Pat. No. 3,944,631.

Other impact modifiers include the above-described types containing units having polar groups or active functional groups, as well as miscellaneous polymers such as Thiokol rubber, polysulfide rubber, polyurethane rubber, polyether rubber (e.g., polypropylene oxide), epichlorohydrin rubber, ethylene-propylene rubber, thermoplastic polyester elastomers and thermoplastic ether-ester elastomers.

The copolymer-containing compositions of this invention may also contain conventional ingredients such as fillers, flame retardants, pigments, dyes, stabilizers, antistatic agents, crystallization aids, mold release agents and the like, as well as resinous components not previously discussed.

The proportions of polyphenylene ether, other polymer and other resinous materials such as impact modifier (if present) are not critical; they may be widely varied to provide compositions having the desired properties. Most often, the polyphenylene ether is employed in an amount in the range of about 5-95%, preferably about 15-70%, of the composition by weight. Impact modifiers are usually present in an amount up to about 50 parts per 100 parts of polyphenylene ether.

The preparation of the epoxy-functionalized polyphenylene ethers according to the present invention and their conversion to copolymer-containing compositions is illustrated by the following examples. All parts and percentages are by weight unless otherwise indicated. The polyphenylene ether (hereinafter sometimes "PPE") employed was a commercially available poly(2,6-dimethyl-1,4-phenylene ether) having an intrinsic viscosity in chloroform at 25° C. of 0.41 dl./g.

EXAMPLE 1

A mixture of 100 parts of PPE, 4 parts of glycidyl acrylate, 3 parts of a commercially available hydrogenated poly-α-olefin sold under the designation "Emery 3008" and 0.2 part of 2,5-dimethyl-2,5-di-t-butylperoxy-3-hexyne was intimately blended and extruded on a counterrotating, non-intermeshing twin screw extruder at temperatures in the range of 120°–265° C. The extrudate was pelletized and dried for 3 hours at 110° C. A sample of the product, which was the desired functionalized polyphenylene ether, was analyzed for gel content after extraction with toluene.

An intimate blend of 1 part of the functionalized polyphenylene ether, 2 parts of a commercially available poly(butylene terephthalate) having a number average molecular weight of about 50,000, and 0.33 part of a commercially available triblock copolymer with polystyrene end blocks having weight average molecular weights of 29,000 and a hydrogenated butadiene midblock having a weight average molecular weight of 116,000 was prepared and extruded with vacuum venting at temperatures in the range of 120°–288° C. The extrudate, which was the desired copolymer-containing composition, was pelletized, dried for 2 hours at 120° C. and molded into Izod test bars whose notched impact strength was then determined.

The relevant properties of the functionalized polyphenylene ether and the copolymer-containing composition are given in Table I, in comparison with three controls: Control A, similarly prepared without the addition of lubricant; Control B, in which the functionalized polyphenylene ether was prepared by extrusion at 300° C.; and Control C, prepared without lubricant by extrusion at 300° C.

TABLE I

|  | Example 1 | Control A | Control B | Control C |
|---|---|---|---|---|
| Gel content of functionalized PPE, % | 0 | 11.0 | 23.8 | 34.6 |
| Average impact strength, joules/m. | 184 | 174 | 97 | 88 |
| Standard deviation, %* | 2.7 | 6.3 | 16.5 | 23.9 |

*Based on average value of impact strength.

It is apparent that the functionalized PPE of the present invention is superior to the controls in having essentially no gel, as compared to gel proportions in excess of 10%. The copolymer-containing composition prepared therefrom is superior both in impact strength and in consistency of impact strength from sample to sample.

EXAMPLE 2

The procedure of Example 1 was repeated, except that the proportion of glycidyl acrylate was 3%. Comparison was made with four controls. The identification of the controls and the results are given in Table II.

TABLE II

|  | Example 2 | Control D | Control E | Control F | Control G |
|---|---|---|---|---|---|
| Epoxy compound** | GA | GA | GA | GA | GMA |
| Lubricant, % | 3 | 0 | 3 | 0 | 3 |
| Functionalization temperature, °C. | 265 | 265 | 288 | 288 | 265 |
| Gel content of functionalized PPE, % | 0 | 0.2 | 0 | 9.0 | 0.3 |
| Average impact strength, joules/m. | 689 | 360 | 379 | 85 | 69 |
| Standard deviation, % | 3.1 | 44.4 | 48.6 | 12.9 | 23.2 |

**GA-glycidyl acrylate; GMA-glycidyl methacrylate.

These results show the superiority of glycidyl acrylate to glycidyl methacrylate in the impact strength and standard deviation results (by comparison with Control G), the superiority of blends containing lubricant to those not containing it (by comparison with Control D), and the superiority of compositions prepared at temperatures within the prescribed range to those prepared at higher temperatures (Example 2 and Control D in comparison with Controls E–F).

EXAMPLE 3

The procedure of Example 2 was repeated, except that the functionalized polyphenylene ether was dissolved in chloroform and reprecipitated as a powder by addition of acetone (2 parts by volume per part of chloroform) prior to formation of the copolymer-containing composition. An additional 3% of lubricant, based on polyphenylene ether, was added prior to extrusion with the polyester. The results are given in Table III, in comparison with a control in which further lubricant was not added.

TABLE III

|  | Example 3 | Control H |
|---|---|---|
| Average impact strength, joules/m. | 673 | 363 |
| Standard deviation, % | 7.1 | 60.3 |

The results show the advantages of reintroducing lubricant prior to copolymer formation, to replace lubricant removed by reprecipitation of the functionalized polyphenylene ether.

What is claimed is:

1. A copolymer-containing composition prepared by the reaction of at least one linear polyester with an epoxy-functionalized polyphenylene ether prepared by melt blending, at a temperature in the range of 250°–285° C., at least one polyphenylene ether with about 2–4% by weight, based on said polyphenylene ether, of glycidyl acrylate in the presence of an amount effective to minimize gel formation of at least one lubricant which is substantially inert to glycidyl acrylate and polyesters; the melt blending time being effective to produce a composition having a gel content no greater than 5% by weight.

2. A composition according to claim 1 wherein the polyphenylene ether is a poly(2,6-dimethyl-1,4-phenylene ether).

3. A composition according to claim 2 wherein the lubricant is at least one hydrogenated poly-α-olefin.

4. A composition according to claim 3 wherein the proportion of hydrogenated poly-α-olefin is about 1–5% by weight, based on polyphenylene ether.

5. A composition according to claim 3 wherein the proportion of glycidyl acrylate is about 3–4%.

6. A composition according to claim 1 wherein the linear polyester comprises structural units of the formula

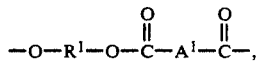

wherein each $R^1$ is independently a divalent aliphatic, alicyclic or aromatic hydrocarbon or polyoxyalkylene radical and $A^1$ is a divalent aromatic radical.

7. A composition according to claim 6 wherein there is also present during the copolymer-forming reaction a lubricating amount of at least one hydrogenated poly-α-olefin.

8. A composition according to claim 6 wherein the polyester is poly(butylene terephthalate).

9. A composition according to claim 8 wherein the polyphenylene ether is a poly(2,6-dimethyl-1,4-phenylene ether).

10. A composition according to claim 6 wherein the polyester is poly(ethylene terephthalate).

11. A composition according to claim 10 wherein the polyphenylene ether is a poly(2,6-dimethyl-1,4-phenylene ether).

* * * * *